United States Patent [19]
Rudolf et al.

[11] Patent Number: 6,015,141
[45] Date of Patent: Jan. 18, 2000

[54] HYDRAULICALLY DAMPING SLEEVE-TYPE RUBBER SPRING

[75] Inventors: Hans-Joachim Rudolf, Stadland; Arnold Simuttis, Bad Kreuznach; Axel Rudolph, Bensheim, all of Germany

[73] Assignee: Firma Carl Freudenberg, Weinheim, Germany

[21] Appl. No.: 08/868,787

[22] Filed: Jun. 4, 1997

[30] Foreign Application Priority Data

Jun. 4, 1996 [DE] Germany ............... 196 22 248

[51] Int. Cl.⁷ .................................................. F16F 5/00
[52] U.S. Cl. ............................................... 267/140.12
[58] Field of Search ................. 267/140.12, 140.14, 267/293, 141.2, 141.3, 141.4

[56] References Cited

U.S. PATENT DOCUMENTS

| | | | |
|---|---|---|---|
| 4,826,145 | 5/1989 | Moore et al. ............................ | 267/293 |
| 5,139,241 | 8/1992 | Hamaekers et al. ................. | 267/140.12 |
| 5,169,130 | 12/1992 | Thelamon et al. .................. | 267/140.12 |
| 5,172,893 | 12/1992 | Bouhier et al. ..................... | 267/140.12 |
| 5,286,011 | 2/1994 | Strand ................................ | 267/140.12 |
| 5,320,332 | 6/1994 | Hamaekers .......................... | 267/140.12 |
| 5,346,191 | 9/1994 | Rudolph ............................. | 267/140.12 |
| 5,386,976 | 2/1995 | Rudolph ............................. | 267/140.12 |
| 5,397,113 | 3/1995 | Kojima et al. ..................... | 267/140.14 |

*Primary Examiner*—Matthew C. Graham
*Assistant Examiner*—Melanie Talavera
*Attorney, Agent, or Firm*—Kenyon & Kenyon

[57] ABSTRACT

A hydraulically-damping sleeve-type rubber spring with an inner support element, which is surrounded by an outer support element at a radial distance. A spring element made of an elastomeric material is arranged in the gap formed by the radial distance. The outer support element and the spring element delimit at least one working chamber, which is connected with at least one first equalization chamber by at least one damping channel to conduct fluid. Viewed in cross-section, the first equalization chamber is delimited by the outer support element and a rubber-elastic expansion wall, where at least one second equalization chamber is arranged in the first equalization chamber, and the second equalization chamber is connected with the working chamber by a connecting channel.

14 Claims, 8 Drawing Sheets

HYDRAULICALLY DAMPING SLEEVE-TYPE RUBBER SPRING

BACKGROUND OF THE INVENTION

1. Field of the Invention

The invention relates to a hydraulically damping sleeve-type rubber spring with an inner support element, which is surrounded by an outer support element at a radial distance. The spring element is made of an elastomeric material and arranged in the gap formed by the radial distance. The outer support element and the spring element delimit at least one working chamber, which is connected with at least one first equalization chamber by at least one damping channel, to conduct fluid.

2. Description of the Prior Art

A sleeve-type rubber spring is shown in DE 38 20 805 A1. The sleeve-type rubber spring is used for mounting an engine of a motor vehicle on a motor vehicle chassis. The spring element is arranged between the inner support element and the outer support element, where the spring element has a cavity above the point of stress introduction on the inner support element. In the direction of stress introduction, the working chamber and the equalization chamber are connected with one another by the damping channel. The damping channel is a component of a partition which separates the working chamber from the first equalization chamber, where a recess is provided within the partition, and a vibration plate is arranged within the partition, and a vibration plate is arranged within the recess, to isolate higher-frequency, low-amplitude vibrations. The vibration plate can move back and forth in the direction of the vibrations introduced. The previously known sleeve-type rubber spring consists of a plurality of individual parts, which is not very satisfactory in terms of economics and production technology.

SUMMARY OF THE INVENTION

The object of the present invention is to develop a sleeve-type rubber spring, in such a way that a significantly simplified structure and better usage properties with regard to isolation/damping of vibrations are obtained, and that the bearing causes lowering of the dynamic spring rate in at least two frequency ranges. In addition, it is supposed to be easy to adapt the sleeve-type rubber spring to the conditions of an individual case of use by simple design changes.

To accomplish the task of the present invention, the first equalization chamber, when viewed in cross-section, is delimited by the outer support element and a rubber-elastic expansion wall, at least one second equalization chamber is arranged in the first equalization chamber, and the first equalization chamber is connected with the working chamber by a connecting channel. It is advantageous that the sleeve-type rubber spring has a simple structure, with few parts, and therefore can be easily and cost-effectively produced, in terms of economics and production technology. The entire sleeve-type rubber spring needs only two parts which must be assembled, where the second part is formed by the inner support element and the spring element connected with the inner support element. The portion including the spring element and the inner support element is assembled with the outer support element, which forms the first part.

When low-frequency, high-amplitude vibrations are introduced into the sleeve-type rubber spring of the present invention, the inner support element is radially displaced, with reference to the outer support element. Part of the fluid contained in the working chamber is transported through the damping channel into the first equalization chamber, as the result of a volume reduction of the working chamber. The fluid volume displaced out of the working chamber is held in the first equalization chamber and passed back to the working chamber when the two support elements return to their initial position relative to one another. The sleeve-type rubber spring can be tuned for low-frequency, high-amplitude vibrations by varying the length and/or the cross-section of the damping channel.

To isolate higher-frequency, low-amplitude vibrations, in contrast, there is no fluid displacement from the working chamber through the damping channel into the equalization chambers, but only vibration excitation of the fluid components contained in the second equalization chamber, which is connected with the working chamber by a connecting channel.

In the range of low-frequency vibrations, lowering of the dynamic spring rate takes place during fluid displacements from the working chamber through the damping channel into the first equalization chamber. A second reduction in the dynamic spring rate, in a comparatively higher-frequency range, takes place by means of vibration excitation of the fluid components within the second equalization chamber. The third reduction in the dynamic spring rate, at a frequency which is even higher than the frequencies in the range of the first and second reduction, takes place by the excitation of fluid components in the two partial chambers of the first equalization chamber.

The second equalization chamber can have an essentially kidney-shaped cross-section, can extend in the circumferential direction of the sleeve-type rubber spring and be delimited on all sides by membrane-like delimitation walls made of a rubber-elastic material. The delimitation walls are assigned to the outer support element and the expansion wall, adjacent one another at a radial distance, in each instance. The radial distance at which the delimitation walls are assigned to the outer support element and the expansion wall is sized in such a way that when low-frequency, high-amplitude vibrations are introduced, expansion of the second equalization chamber takes place. The second equalization chamber can be expanded, for example, until the delimitation walls rest against the outer support element in the radial direction on the outside, and against the expansion wall of the first equalization chamber in the radial direction on the inside. This structure has the result that undesirable tensile/shear stress, which reduces the useful lifetime, is reliably precluded within the delimitation walls. The delimitation walls can be provided with a reinforcement, for example, where the reinforcement can be arranged on the side of the delimitation walls facing toward the first equalization chamber, within the delimitation walls, or within the second equalization chamber.

The second equalization chamber is preferably structured to be pocket-shaped in the axial direction and extends parallel to the longitudinal axis of the sleeve-type rubber spring, into the first equalization chamber. The span of the second equalization chamber in the axial direction can be adapted to the actual conditions of use. If, for example, the largest possible volume of the second equalization chamber is desired, and if its span in the circumferential direction is not allowed to exceed a relatively small expanse, it is possible that the second equalization chamber can extend over almost the entire axial length of the sleeve-type rubber spring. The delimitation walls of the second equalization chamber are completely surrounded by the damping fluid located in the first equalization chamber.

The spring element, the expansion wall, and the delimitation wall can be structured to be made in one piece, with a transition from one to the other, and of the same material. This makes handling of the individual parts for assembly of the sleeve-type rubber spring particularly simple. In addition, a separate seal between the parts, which is made of elastomeric material in each instance, is unnecessary. Even during a long period of use, a secure seal of the working chamber and the two equalization chambers towards the environment is guaranteed.

In order to achieve better tuning to the conditions of use in each instance, three second equalization chambers can be arranged within the first equalization chamber, uniformly distributed in the circumferential direction. The second equalization chambers are preferably structured with delimitation walls that have different degrees of expansion elasticity and/or they have different volumes. The somewhat more complicated structure of this sleeve-type rubber spring is offset by further improved usage properties with regard to optimum adaptation of the usage properties to the individual conditions of use. With the greater number of second equalization chambers, it is possible to achieve further reductions in the dynamic spring rate in other frequency ranges, in addition to the at least two reductions in the dynamic spring rate.

Within the scope of the present invention, however, the embodiment, with only one second equalization chamber represents an excellent compromise between the simplest structure of the sleeve-type rubber spring with good isolation/damping of vibrations which are introduced, and is therefore preferred for most cases of use.

The first equalization chamber can have at least two partial chambers, which are connected with one another, to conduct fluid, by a throttle aperture. The throttle aperture preferably extends within the first equalization chamber, in the circumferential direction, where the damping channel preferably opens into the partial chamber of the first equalization chamber in which at least one second equalization chamber is arranged. By fluid displacement between the two partial chambers of the first equalization chamber via the throttle aperture, another reduction in the dynamic spring rate is produced. The throttle aperture can be delimited, for example, by the inside circumferential surface of the outer support element and a partial thickening of the expansion wall only in the region of the throttle aperture. The damping behavior of the sleeve-type rubber spring can be influenced as a function of the cross-section of the throttle aperture and/or its length.

The working chamber has an essentially trapezoidal cross-section. Because of the trapezoidal cross-section of the working chamber, the first equalization chamber has a comparatively large expanse when viewed in the circumferential direction of the sleeve-type rubber spring. If necessary, several second equalization chambers and/or several partial chambers can be provided, which are connected with one another by throttle apertures.

Pursuant to an advantageous embodiment, the inner support element can be completely surrounded by the spring element on the circumferential side. This is advantageous because no additional rust-protection measures are required for the inner support element. In addition, by mantling the inner support element with the spring element, an excellent connection between the two parts is achieved.

It is preferable if the inner support element has an essentially trapezoidal cross-section, in such a way that the support webs of the spring element touch the circumferential surface of the inner support element at an angle of 45 to 90°. Preferably, the angle is 60 to 80°. It should be ensured that the angle is less than 90° in every case. This ensures that when vibrations are introduced into the sleeve-type rubber spring, and the two support elements are radially displaced relative to one another, pressure pre-stress always prevails within the two support webs. This precludes tensile stress, which reduces the useful lifetime of the spring element, which is made of an elastomeric material.

The inner support element can have a contact buffer on the side facing away from the working chamber, which is formed in one piece with the spring element. This prevents harmful tensile stress from occurring within the support webs during extreme deflection movements of the inner support element relative to the outer support element. When viewed in cross-section, the two support webs, the inner support element arranged between them, as well as the contact buffer arranged on the side of the inner support element which faces away from the support webs, are all structured with a roof shape. The structure of the sleeve-type rubber spring, which has only a few parts, is not detrimentally affected by the contact buffer, since the contact buffer is made in one piece with the spring element and therefore also in one piece with the expansion wall of the first equalization chamber and the delimitation walls of the second equalization chamber.

The inner support element can have an open anti-rotation element, located on its face, at least on one side, in the axial direction. Preferably, anti-rotation elements are used on both sides, in the axial direction. The anti-rotation elements are preferably structured as dead-end bores and serve to ensure assembly in the correct position when the inner support element is attached to a suitable counter-piece.

The anti-rotation devices are preferably arranged in radial projections which extend radially in the direction of the working chamber, where a recess which extends parallel to the longitudinal axis of the sleeve-type rubber spring is provided in the axial direction, between the radial projections. It is advantageous if the radial resilience of the inner support element relative to the outer support element, crosswise to the main direction of the vibrations introduced, is increased by the recess in the inner support element and by the fact that the recess is filled with an elastomeric material of the spring element. The anti-rotation devices which are provided influence the properties in use of the sleeve-type rubber spring to a negligible degree, although the anti-rotation devices clearly simplify assembly of the sleeve-type rubber spring.

By raising the height of the inner support element at the location of the recess, it is possible to increase the axial/radial stiffness in the secondary directions, if this is required for an application.

The spring element and a window pipe made of impact-resistant material, preferably a metal material, form an entity and are connected to one another by vulcanization. The window pipe, which is almost completely surrounded by the elastomeric material of the spring element, forms a reliable seal relative to the environment of the sleeve-type rubber spring, because the entity is arranged within the outer support element with elastic pre-stress.

For assembly of the claimed sleeve-type rubber spring, first the outer support element is flanged in the region of its two faces, in such a way that the flanged first part forms a stop for the second part to be inserted. The second part includes the inner support element, mantled on the circumference by the elastomeric material of the spring element, and the window pipe, which is also surrounded by the elastomeric material of the spring element, as well as the expansion walls of the first equalization chamber and the delimitation walls of the second equalization chamber, which are formed in one piece with the spring element. After the second part is introduced into the first part formed by the outer support element, in a fluid bath filled with damping fluid, the second face of the outer support element is flanged, so that the two parts of the sleeve-type rubber spring are connected to one another so as not to come loose and so as to form a liquid seal. Joining the two parts under fluid ensures that no air cushions form within the sleeve-type rubber spring.

BRIEF DESCRIPTION OF THE DRAWING

An exemplary embodiment of the sleeve-type rubber spring according to the invention will be explained in greater detail below, on the basis of the attached drawings. These show, in schematic representation.

DETAILED DESCRIPTION OF THE INVENTION

Figure 1:
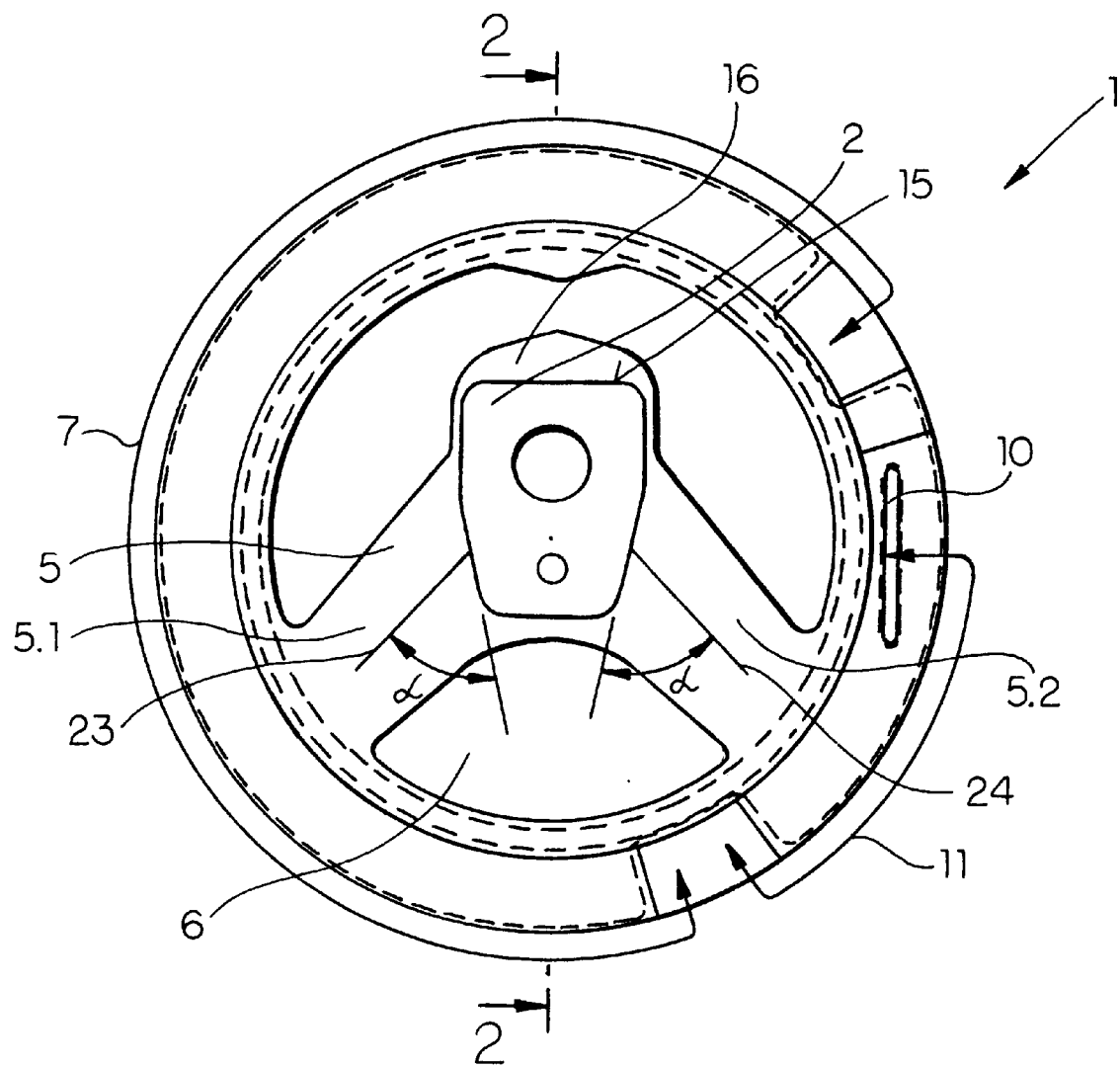
FIG. 1 is a top view of a sleeve-type rubber spring without an outer support element.

FIGS. 1 to 4 show an exemplary embodiment of a sleeve-type rubber spring 1, which is structured as a single-chamber bearing, and consists of only two parts that have to be assembled together. One of the parts is formed by the outer support element 3, while the other part is formed by an element 22, which includes a spring element 5, an expansion wall 9, delimitation walls 12, and the contact buffer 16, as well as the window pipe 21. The spring element 5, the expansion wall 9, the delimitation walls 12, and the contact buffer 16 are of the same elastomeric material and are made in one piece, with a transition from one to another.

The outer support element 3 and the spring element 5 delimit a working chamber 6 filled with damping fluid, which is connected to at least one first equalization chamber 8, also filled with damping fluid. The first equalization chamber 8 absorbs volume from working chamber 6 without an increase in pressure, via at least one damping channel 7 conducting fluid. The first equalization chamber 8 extends along the inside circumferential surface of the outer support element 3, and is delimited by the outer support element 3 in the radial direction and on the outside, and by the rubber-elastic expansion wall 9 in the radial direction and on the inside. Within the first equalization chamber 8, there is a second equalization chamber 10, which is connected to the working chamber 6 by the connecting channel 11.

FIG. 1 schematically shows the different lengths of the damping channel 7 and the connecting channel 11. In the embodiment of FIG. 1, the damping channel 7 is longer and has a larger passage cross-section than the connecting channel 11. In this exemplary embodiment, the first equalization chamber 8 has two partial chambers 8.1, 8.2, where the damping channel 7 has a length which corresponds to three-fourths of the circumference of the sleeve-type rubber spring, and the channel 7 opens into the working chamber 6, on one side, and into the second partial chamber 8.2, on the other side.

Figure 2:
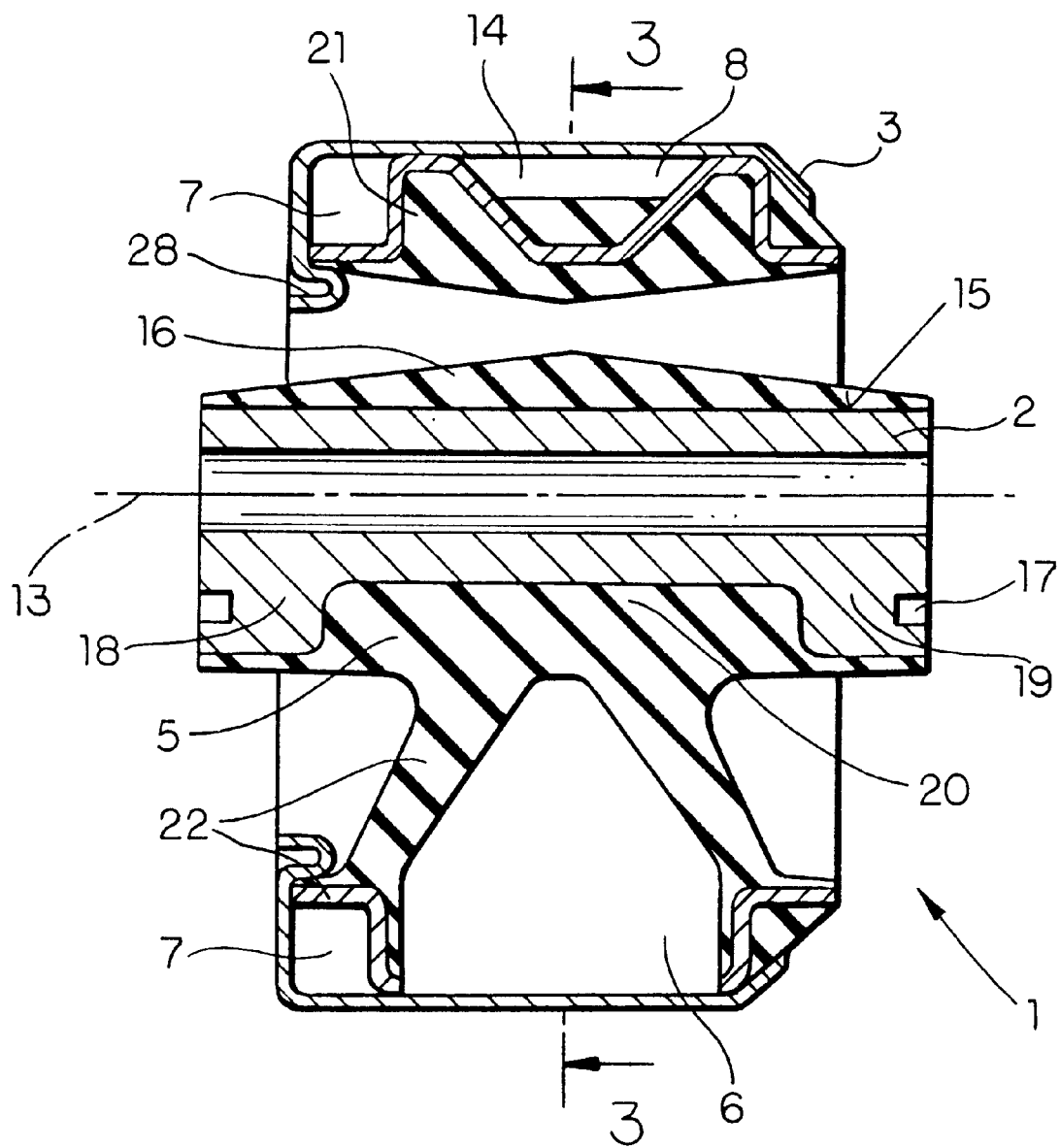
FIG. 2 is a cross-section through line A—A of the sleeve-type rubber spring of FIG. 1.

FIG. 2 shows a longitudinal cross-section through the sleeve-type rubber spring of FIG. 1, along the line A—A. In this figure, the damping channel 7 is shown, which extends in the circumferential direction around the sleeve-type rubber spring 1, opens into the working chamber 6, and is delimited by the outer support element 3 and the window pipe 21. The structure of the inner support element 2 is clearly evident in FIG. 2. The inner support element 2 is completely surrounded by the elastomeric material of the spring element 5 on its outside circumference, and has a contact buffer 16 on the side facing away from the working chamber 6, to limit extreme relative displacements of the inner support element 2 with reference to the outer support element 3.

In this exemplary embodiment, the inner support element 2 is made of a metallic material and has open anti-rotation elements 17 in the region of its two faces, in the axial direction, which are formed as dead-end bores. The anti-rotation elements 17 are arranged within radial projections 18, 19, which extend in the direction of the working chamber 6, where the recess 20 of the inner support element 2 extends between the radial projections 18, 19 in the axial direction. With this structure, greater resilience of the sleeve-type rubber spring in the direction perpendicular to the plane of the drawing is achieved.

Figure 3:
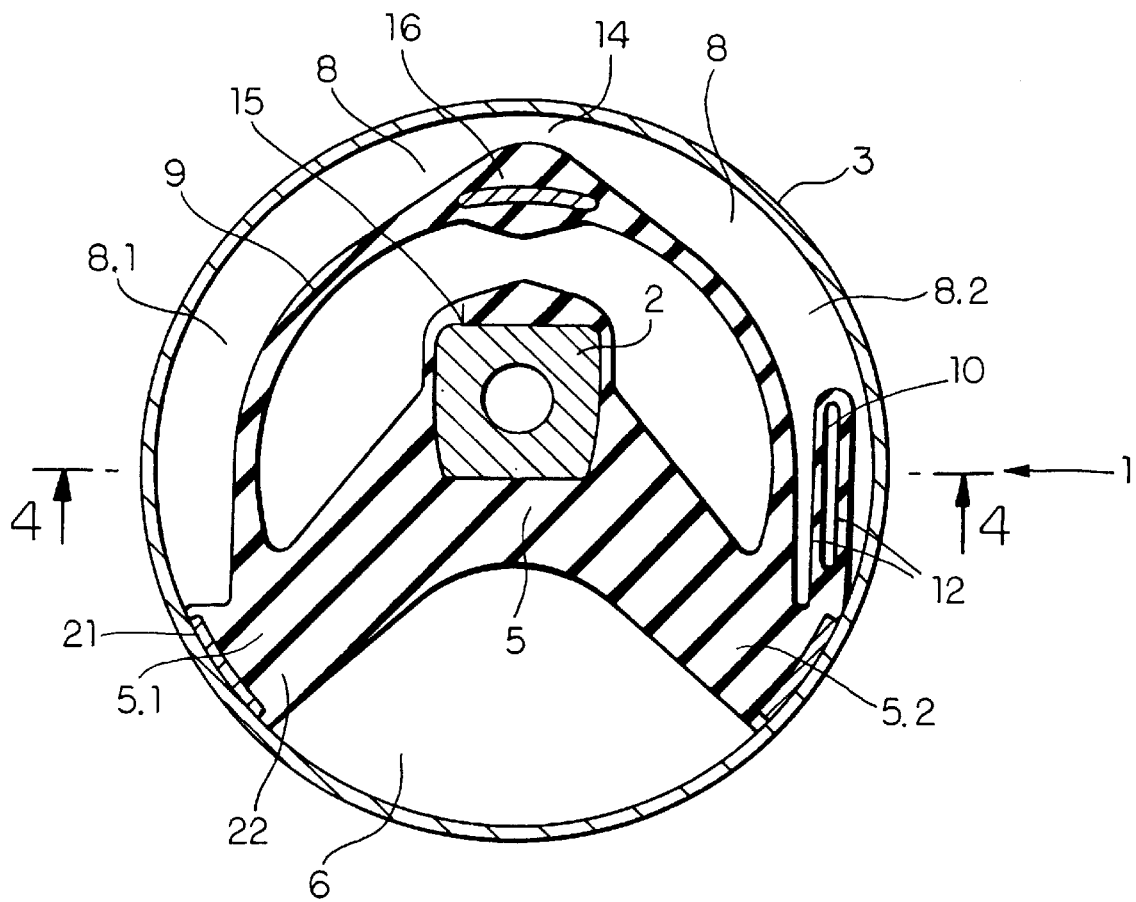
FIG. 3 is a cross-section through line B—B of FIG. 2.

FIG. 3 shows the cross-section B—B from FIG. 2. It is evident that the second equalization chamber 10, arranged in the first equalization chamber 8, has an essentially kidney-shaped cross-section and extends in the circumferential direction of the sleeve-type rubber spring 1. The second equalization chamber 10 is delimited on all sides by membrane-like, expandable delimitation walls 12 made of a rubber-elastic material. The second equalization chamber 10 is arranged within the first equalization chamber 8, which is filled with damping fluid, in such a way that its delimitation walls 12 are arranged in the radial direction adjacent to and at a distance from the outer support element 3 and the expansion wall 9 of the first equalization chamber 8.

In the embodiment of FIG. 3, the first equalization chamber 8 is formed by two partial chambers 8.1, 8.2, which are connected with one another by a throttle aperture 14 which extends in the circumferential direction.

The inner support element 2 has a trapezoidal cross-section, where the contact surfaces between the inner support element 2 and the spring element 5 form an angle $\alpha$ with an imaginary planes 23, 24 intersecting the support webs 5.1, 5.2 through the center. The angle is 65° in this exemplary embodiment.

Figure 4:
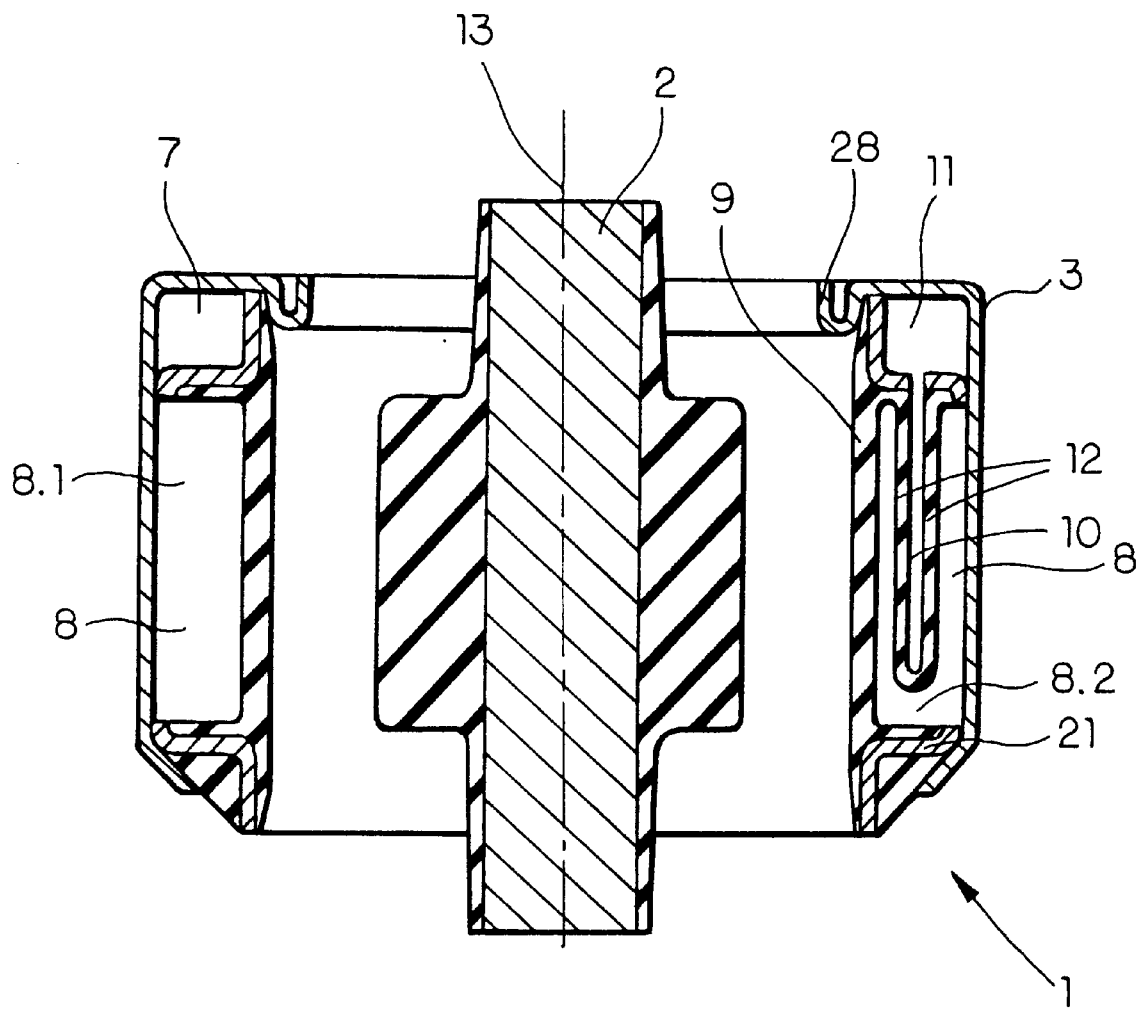
FIG. 4 is a cross-section through line C—C of FIG. 1.

FIG. 4 shows the cross-section C—C from FIG. 1. The second equalization chamber 10 extends parallel to the longitudinal axis 13 of the sleeve-type rubber spring 1, is structured in a pocket shape, where the ratio of the axial depth of the first equalization chamber 8 to the axial depth of the second equalization chamber 10 should be at most two. In this example, the ratio is 1.2. The outer support element 3 is provided with an end stop 28 radially on the inside, which extends in the circumferential direction and can be brought into contact with the inner support element 2, to limit extreme deflection movements of the inner support element 2 relative to the outer support element 3, in the radial direction. The delimitation walls 12 can be provided with profiles on the sides facing each other, or on the sides facing away from each other, in order to prevent contact noises and/or undesirable over-expansion of the elastomeric material when the delimitation walls touch one another or the adjacent expansion wall as well as the outer support element.

Figure 5:
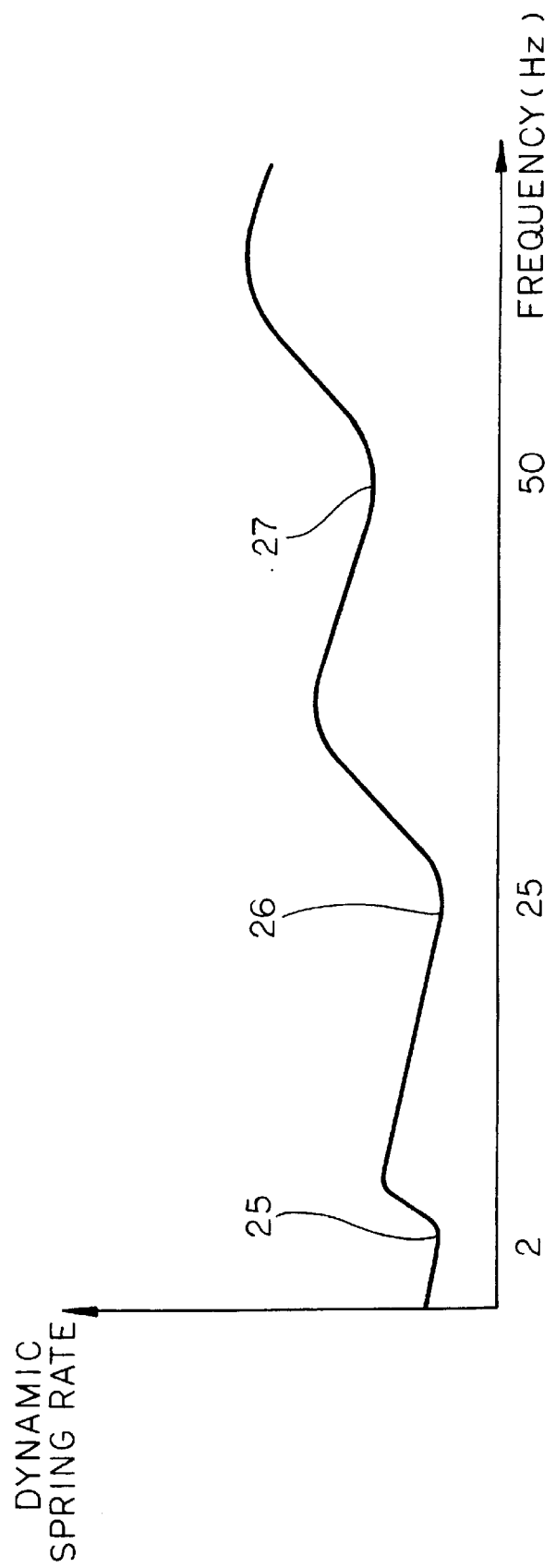
FIG. 5 is a diagram in which the dynamic spring rate of the sleeve-type rubber spring shown in FIG. 1 to 4 is plotted relative to frequency.

FIG. 5 shows a diagram in which the dynamic spring rate is plotted relative to the frequency for the sleeve-type rubber spring 1 shown in FIGS. 1 to 4. By using the sleeve-type rubber spring 1, the dynamic spring rate can be lowered in three frequency ranges. In the first frequency range 25, around 4 Hz, the dynamic spring rate is lowered by fluid displacement from the working chamber 6 through the damping channel 7 into the second partial chamber 8.2 of the first equalization chamber 8. The second reduction 26 takes place in the range of 25 Hz, in that fluid components in the second equalization chamber 10 are excited to vibrate. The third reduction 27 in the dynamic spring rate takes place in the range around 50 Hz, and is achieved in that a vibration of the fluid column takes place between the two partial chambers 8.1, 8.2, in the throttle aperture 14.

Figure 6:
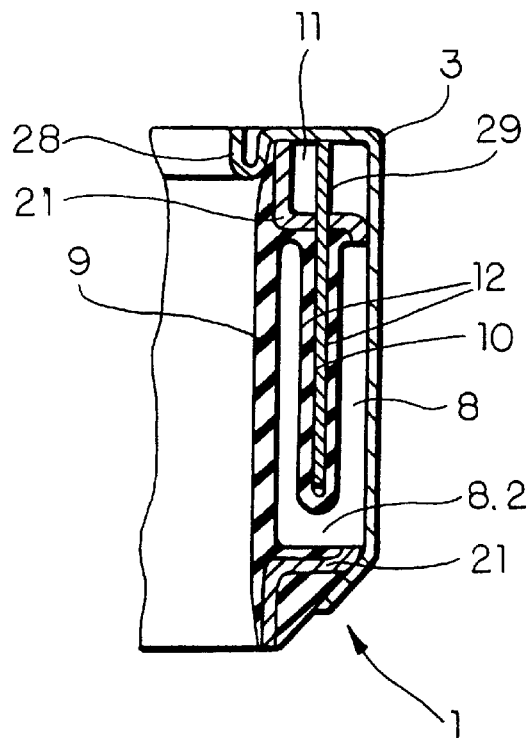
FIG. 6 is another embodiment of the second equalization chamber.
Figure 7:
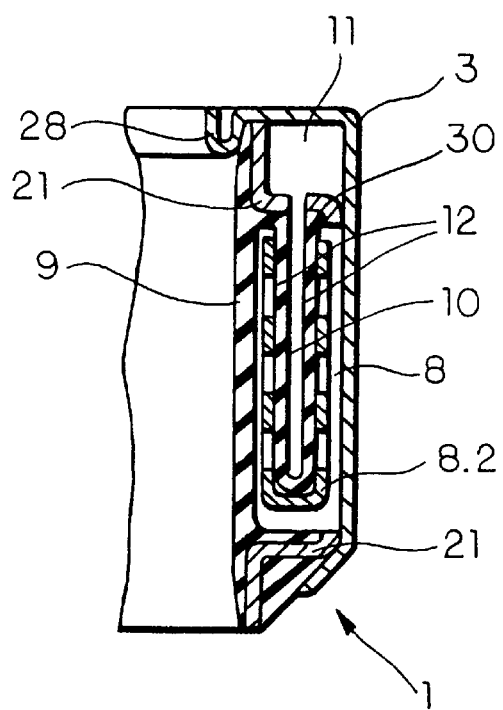
FIG. 7 is a third embodiment of the second equalization chamber which deviates from FIG. 6.

FIGS. 6 and 7 show further exemplary embodiments of the second equalization chamber 10. In FIG. 6, the delimitation walls are separated from one another on the sides which face one another, by a first molded part 29. The molded part 29 can be made, for example, of an impact-resistant polymeric material, and prevents contact between the delimitation walls 12, if a partial vacuum exists within the second equalization chamber 10.

FIG. 7 shows a second molded part 30, which surrounds the delimitation walls 12 of the second equalization chamber 10 on the outside, like a clamp. This prevents an over-expansion of the material of which the delimitation walls are made, resulting in damage to the sleeve-type rubber spring 1, if such an over-expansion is caused by excess pressure. Furthermore, the second molded part 30 can also be used to additionally adapt the spring characteristics of the sleeve-type rubber spring 1 to the conditions of the case of use in each instance.

In FIGS. 1 to 4, the sleeve-type rubber spring 1 is structured as a single-chamber bearing.

Figure 8:
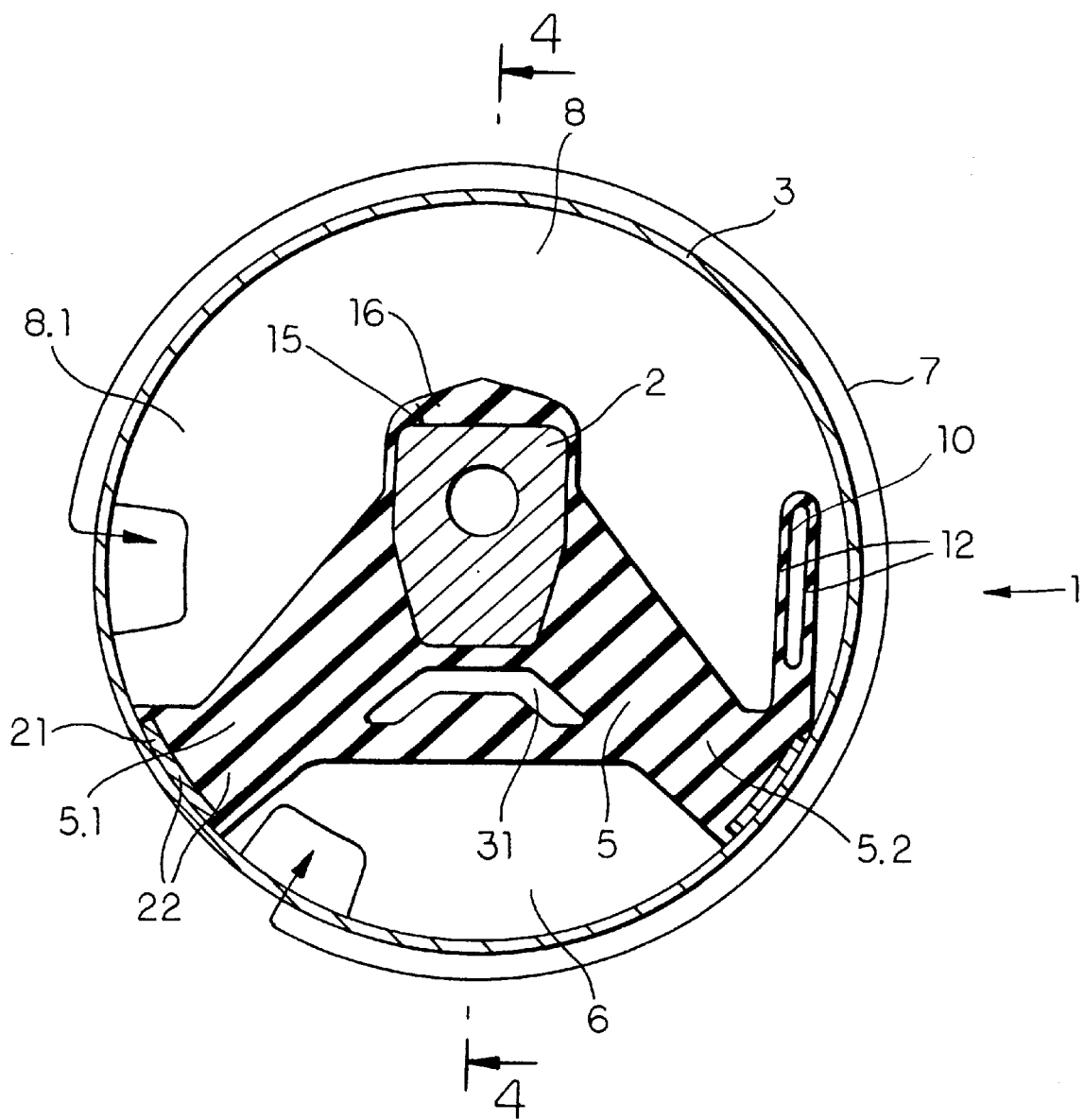
FIG. 8 is a cross-section through line D—D of FIG. 9, where the sleeve-type rubber spring is structured as a two-chamber bearing.
Figure 9:
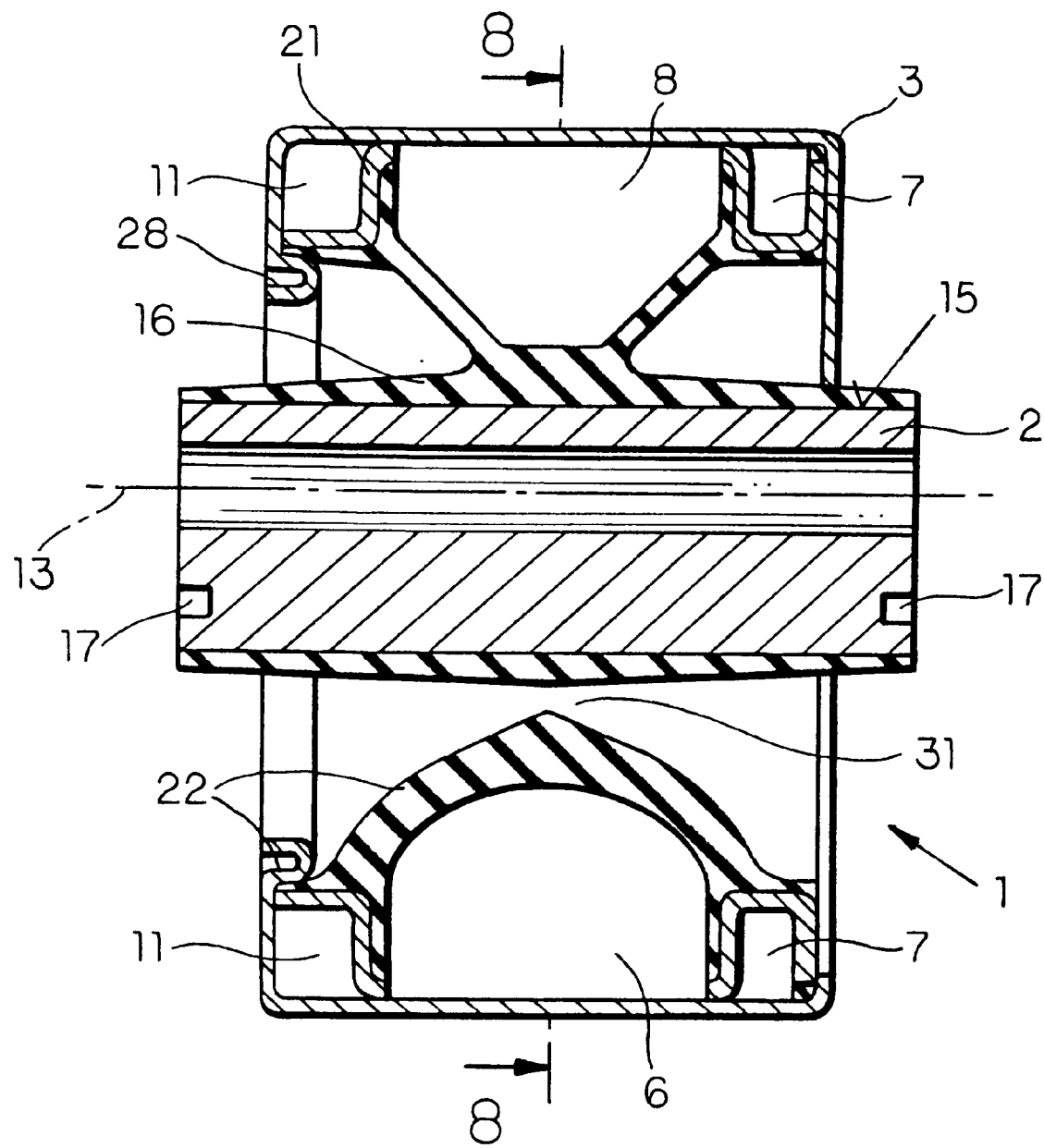
FIG. 9 is a cross-section through line E—E of FIG. 8.

In FIGS. 8 and 9, a sleeve-type rubber spring 1 is shown which is structured as a two-chamber bearing. The first equalization chamber 8 forms the second chamber next to the working chamber 6, and is delimited by the outer support element 3 and the spring element 5. Between the support webs 5.1, 5.2, a passage 31 is provided, below the inner support element 2 in the radial direction, which extends parallel to the longitudinal axis 13 of the sleeve-type rubber spring 1. In this example, the damping channel 7 extends almost over the entire circumference of the sleeve-type rubber spring 1, from the working chamber 6 into the first equalization chamber 8.

FIG. 9 shows the cross-section E—E from FIG. 8. Both the connecting channel 11 and the damping channel 7 extend almost over the entire circumference of the sleeve-type rubber spring 1, where the window pipe 21 delimits an essentially U-shaped groove, radially open to the outside, in the region of one of the frontal delimitations of the sleeve-type rubber spring 1, to form the damping channel 7. The connecting channel 11 is provided on the opposite face of the sleeve-type rubber spring 1, in the axial direction.

The sleeve-type rubber spring according to the invention, as shown in FIGS. 1 to 4 as well as 8 and 9, is shown in the statically unstressed state, as it is produced, in each instance.

We claim:

1. A hydraulically damping device comprising:

a sleeve-type elastomeric spring, an inner support element, and an outer support element which surrounds the inner support element at a radial distance, the spring comprising a spring element of an elastomeric material arranged in a gap between the inner support element and the outer support element, the outer support element and the spring element delimiting at least one working chamber, the damping device further comprising at least one damping channel and at least one first equalization chamber which is connected to the at least one working chamber by the at least one damping channel, the at least one damping channel conducting fluid, the spring comprising an expansion wall, the first equalization chamber, when viewed in cross-section, being delimited by the outer support element and the expansion wall, the damping device comprising at least one second equalization chamber arranged in the first equalization chamber, the at least one second equalization chamber being connected with the working chamber by a connecting channel, wherein the second equalization chamber extends in the circumferential direction, and wherein the second equalization chamber is delimited on all sides by membrane-like delimitation walls made of a rubber-elastic material, and wherein the delimitation walls are spaced from the outer support element and the expansion wall by a radial distance.

2. The hydraulic damping device of claim 1, wherein:

the spring element, the expansion wall, and the delimitation walls are constructed integrally in one piece and of the same material.

3. The hydraulic damping device of claim 1, wherein:

three second equalization chambers are arranged within the first equalization chamber, and are uniformly distributed in the circumferential direction.

4. The hydraulic damping device of claim 3, wherein:

the second equalization chambers have delimitation walls with different degrees of expansion elasticity.

5. The hydraulic damping device of claim 3, wherein:

the second equalization chambers have different volumes.

6. The hydraulic damping device of claim 1, wherein:

the working chamber has an essentially trapezoidal cross-section.

7. The hydraulic damping device of claim 1, wherein:

the inner support element is completely surrounded by the spring element.

8. The hydraulic damping device of claim 1, wherein:

the inner support element comprises a contact buffer on a side facing away from the working chamber, and wherein the contact buffer is formed integrally and in one piece with the spring element.

9. The hydraulic damping device of claim 1, wherein:

the inner support element comprises an anti-rotation element located on at least one axial face of the inner support element.

10. The hydraulic damping device of claim 9, wherein:

the inner support element comprises radial projections which extends radially in the direction of the working chamber, and wherein the anti-rotation element is arranged in at least one of the radial projections, and wherein the inner support element comprises a recess which extends parallel to the longitudinal axis of the spring element, and wherein the recess is located between the radial projections.

11. A hydraulically damping device comprising:

a sleeve-type elastomeric spring, an inner support element, and an outer support element which surrounds the inner support element at a radial distance, the spring comprising a spring element of an elastomeric material arranged in a gap between the inner support element and the outer support element, the outer support element and the spring element delimiting at least one working chamber, the damping device further comprising at least one damping channel and at least one first equalization chamber which is connected to the at least one working chamber by the at least one damping channel, the at least one damping channel conducting fluid, the spring comprising an expansion wall, the first equalization chamber, when viewed in cross-section, being delimited by the outer support element and the expansion wall, the damping device comprising at least one second equalization chamber arranged in the first equalization chamber, the at least one second equalization chamber being connected with the working chamber by a connecting channel, wherein the second equalization chamber is pocket-shaped in the axial direction and extends parallel to a longitudinal axis of the spring element and into the first equalization chamber.

12. A hydraulically damping device comprising:

a sleeve-type elastomeric spring, an inner support element, and an outer support element which surrounds the inner support element at a radial distance, the spring comprising a spring element of an elastomeric material arranged in a gap between the inner support element and the outer support element, the outer support element and the spring element delimiting at least one working chamber, the damping device further comprising at least one damping channel and at least one first equalization chamber which is connected to the at least one working chamber by the at least one damping channel, the at least one damping channel conducting fluid, the spring comprising an expansion wall, the first equalization chamber, when viewed in cross-section, being delimited by the outer support element and the expansion wall, the damping device comprising at least one second equalization chamber arranged in the first equalization chamber, the at least one second equalization chamber being connected with the working chamber by a connecting channel, wherein the first equalization chamber comprises at least two partial chambers, and wherein the at least two partial chambers are connected to one another by a throttle aperture.

13. A hydraulically damping device comprising:

a sleeve-type elastomeric spring, an inner support element, and an outer support element which surrounds the inner support element at a radial distance, the spring comprising a spring element of an elastomeric material arranged in a gap between the inner support element and the outer support element, the outer support element and the spring element delimiting at least one working chamber, the damping device further comprising at least one damping channel and at least one first equalization chamber which is connected to the at least one working chamber by the at least one damping channel, the at least one damping channel conducting fluid, the spring comprising an expansion wall, the first equalization chamber, when viewed in cross-section, being delimited by the outer support element and the expansion wall, the damping device comprising at least one second equalization chamber arranged in the first equalization chamber, the at least one second equalization chamber being connected with the working chamber by a connecting channel, wherein the inner support element has an essentially trapezoidal cross-section, and wherein the spring element comprises support webs, the support webs touching circumferential surfaces of the inner support element at an angle of between 45° and 90°.

14. A hydraulically damping device comprising:

a sleeve-type elastomeric spring, an inner support element, and an outer support element which surrounds the inner support element at a radial distance, the spring comprising a spring element of an elastomeric material arranged in a gap between the inner support element and the outer support element, the outer support element and the spring element delimiting at least one working chamber, the damping device further comprising at least one damping channel and at least one first equalization chamber which is connected to the at least one working chamber by the at least one damping channel, the at least one damping channel conducting fluid, the spring comprising an expansion wall, the first equalization chamber, when viewed in cross-section, being delimited by the outer support element and the expansion wall, the damping device comprising at least one second equalization chamber arranged in the first equalization chamber, the at least one second equalization chamber being connected with the working chamber by a connecting channel; and a window pipe, wherein the spring element and the window pipe are made of an impact-resistant material and are connected to one another by vulcanization.

* * * * *